(12) United States Patent
Pagan

(10) Patent No.: US 7,275,150 B2
(45) Date of Patent: Sep. 25, 2007

(54) METHOD AND SYSTEM FOR ADDING FREQUENTLY SELECTED APPLICATIONS TO A COMPUTER STARTUP SEQUENCE

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 10/800,836

(22) Filed: Mar. 15, 2004

(65) Prior Publication Data
US 2005/0204198 A1  Sep. 15, 2005

(51) Int. Cl.
G06F 9/00 (2006.01)
G06F 15/177 (2006.01)

(52) U.S. Cl. .......................................... 713/1
(58) Field of Classification Search ................ 713/1
See application file for complete search history.

(56) References Cited

U.S. PATENT DOCUMENTS 5,835,759 A * 11/1998 Moore et al. ................ 713/1
5,859,978 A * 1/1999 Sonderegger et al. ........ 709/226
6,202,121 B1 * 3/2001 Walsh et al. ................. 711/100
6,275,932 B1   8/2001 Yamaguchi et al.
6,324,546 B1 * 11/2001 Ka et al. ...................... 707/203
2002/0122076 A1 * 9/2002 Nakaki ........................ 345/847
2004/0045011 A1 * 3/2004 Chou ........................... 719/320
2004/0083473 A1 * 4/2004 Thomas et al. ............... 717/174

* cited by examiner

*Primary Examiner*—Rehana Perveen
*Assistant Examiner*—Mohammed H Rehman
(74) *Attorney, Agent, or Firm*—Ronald V. Davidge; Cynthia S. Byrd

(57) ABSTRACT

A computer system includes an automatic startup configuration utility running in a startup sequence to update the startup sequence according to the actions of a user in launching applications during an initial portion of an operating session. An application is considered for automatic launching based on the number of times it has been launched in the past and on the percentage of possible times that it has been launched. Preferably, before an application is added to the startup sequence, the user is presented with a dialog box asking him whether he wishes the application to be added for automatic launching in subsequent operating sessions, or whether he wishes the application to be removed from consideration for automatic launching.

12 Claims, 5 Drawing Sheets

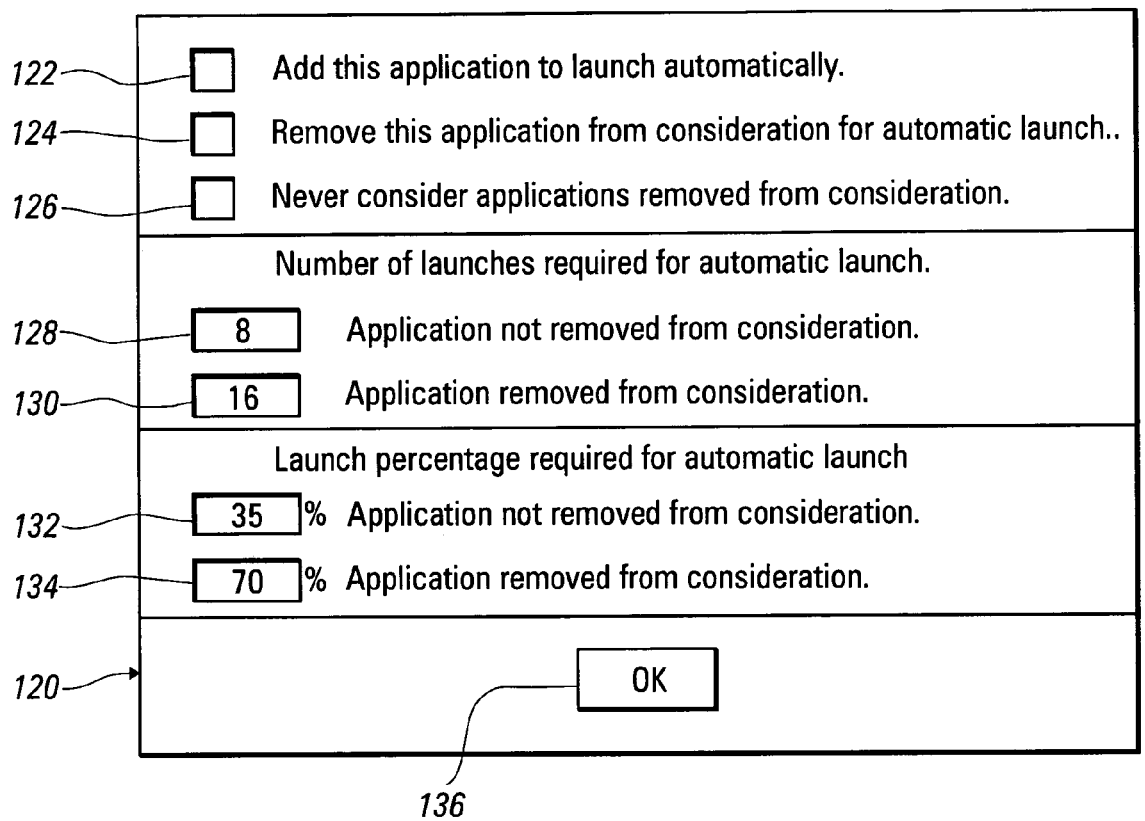
FIG. 3
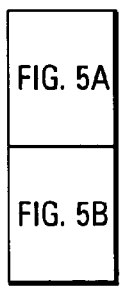
FIG. 4
FIG. 5

METHOD AND SYSTEM FOR ADDING FREQUENTLY SELECTED APPLICATIONS TO A COMPUTER STARTUP SEQUENCE

BACKGROUND OF THE INVENTION

1. Field of the Invention

This invention is related to updating a startup sequence stored within a personal computer for determining utilities and applications that are automatically started upon booting the operating system or upon signing onto the system as a user.

2. Summary of the Background Art

Many users of computer systems start or launch the same applications repeatedly upon first starting their computing session. Computer operating systems provide for startup sequences in which various utilities and/or applications are listed to be started each time the operating system is booted and/or when a new user logs onto the computer system. Different start-up sequences may be provided for the different users registered to use the computer system as each of the users logs on. Such startup sequences are used, for example, to start programs that should be run whenever the system is turned on, such as antivirus utilities. A user may also perform selections within certain applications so that data causing them to be started is placed in the startup sequence. For example, a user may wish to start a check-balancing program so that he can balance his check register whenever he boots his system or signs in as a user.

Additionally, Microsoft WINDOWS® XP provides a user startup folder for each user containing shortcuts that run whenever the particular user logs on and a common startup folder containing shortcuts that run whenever any user logs on. Additionally, a scheduled tasks folder is provided for each user so that the administrator can specify tasks to be performed within each user account at startup. Registry keys are also used to control the startup sequences, with programs listed in a machine run key of the registry being available for all users, and with programs listed in the registry run key of the current user running whenever the user logs on again. Another group of registry keys for the machine and for individual user accounts, called RunOnce and RunOnceEx keys, identify programs that run once and only once at startup. Additionally, the Group Policy features of WINDOWS Servers can be used to control the startup sequences of client systems.

However, what is needed is an automatic startup configuration utility providing a way for a user to add an application to the startup sequence without a need to find a way within the application to change a setting to do this, and without having to determine start and determine how to use a utility within the operating system to modify the sequence.

U.S. Pat. Application Pub. No. 2002/0122076 describes a computer system in which, when an application is started, a shortcut icon is created to be used to start up the application program, with a shortcut icon that is determined to be no longer wanted being automatically deleted. Preferably, the creation condition includes the number of application program startups as a threshold value, and the startup record includes the number of application program startups Since a typical computer has a large number of icons, from which an existing icon must be located to start an application, what is needed is a method for subsequently starting a frequently-used application in the future without requiring the use of a startup icon.

U.S. Pat. Nos. 6,324,546 and 6,202,121 describe methods for improving the performance of computer systems that typically include many application programs stored on high capacity memory devices, such as hard drives, which are typically slow relative to other components of a computer system, and which thus noticeably reduce the overall performance, particularly during the start of application programs. According to the method of U.S. Pat. No. 6,324,546, the application programs are organized in memory devices so that often used application programs are stored in areas that are faster to access or otherwise have less effect on computer performance. The operating system logs, or records, certain information every time an application program is started, with the log ultimately providing a convenient measure of how frequently application programs are used. The log is then used to reorganize how application programs are stored in a memory device. According to the method of U.S. Pat. No. 6,202,121, during the installation process, the installation program reads data from a load sequence list and writes the file portions so they are stored in the order prescribed by the load sequence list in contiguous clusters on the hard disk drive. The computer can then read launch related data from the disk in the proper order from contiguous disk clusters, which minimizes or eliminates wasted time that would result from disk accesses if the disk heads had to move between noncontiguous clusters in order to read the launch related data. While these methods improve system performance by reducing the time associated with reading stored data, what is still needed is a way to simplify the use of the computer system by automatically launching application programs under conditions determined by the historical actions of the system user in launching applications.

U.S. Pat. No. 5,859,978 describes a method and apparatus for management of application programs in a computer network. A modified hierarchical database, which includes application objects that represent applications and their execution environments, is utilized. Administrator tools support the creation, deletion, and modification of application objects. Each application object includes the location of an executable code for a given application, an icon, a working directory name, drive mappings, printer port captures, command line parameters, and similar information. An application launcher queries the database and updates a list of available applications, which is kept in the user's desktop. The launcher automatically launches specified applications when a user runs the launcher. The launcher also uses the information in the application object to setup resources needed by the application, to create a process that executes the application, and to clean up after the application terminates. Resource setup involves mapping drives and capturing printer ports as needed. The database, the launcher, and the administrator tools allow consistent tracking and use of information about application programs and their execution environments in the network. In one embodiment, an application launcher allows a user to browse through the application objects, which represent the applications available to that user, and to view the information currently stored in the objects. The launcher also automatically launches specified "auto start" applications when a user runs the launcher. In addition, the launcher updates a list of available applications that is associated with the user's desktop by querying the database. The launcher's update capability relieves administrators of the need to manually update each user's desktop when a new application is added to the network or an established application is moved. What is needed is a system for automatically launching applications according to a history of actions of the user in an ongoing process, so that it is no longer necessary for an administrator or for the user to perform an additional process of determining which applications are to be added and of updating a database.

U.S. Pat. No. 6,275,932 describes a program startup apparatus used in an electronic machine to automatically start a function provided within an electronic machine with a user's single touch operation. The program startup apparatus automatically starts up a predetermined application program stored in the electronic machine. The apparatus has startup condition storage devices for storing a startup condition preset by the user. The apparatus also has a startup sequence control device for starting up the predetermined application program upon determining that the status of the electronic machine matches the startup condition stored in the startup condition storage devices. While this startup apparatus provides for updating a startup sequence by selecting applications from a menu, again what is needed is a method for updating a startup sequence based on the user's selection of applications for launching, using one of the several presently available and familiar user interfaces for launching applications while running an operating system. Additionally, what is needed is a way to provide the user with a method for determining whether an application he has launched is to be added to the startup sequence.

U.S. Pat. No. 5,835,759 describes a method by which a computer application stored on a storage medium (e.g., a portable storage medium such as a compact disk) is automatically launched. Initialization information expressed in accordance with a predefined syntax is stored on the storage medium. Also stored in the computer is "launching" information sufficient, together with the initialization information, to enable the computer to launch the application. The application is automatically launched, without user intervention, by reading the initialization information and using it in connection with the launching information stored in the computer. What is needed is a method providing for the automatic launching of any application stored on the hard drive of a system, in accordance with the historical actions of the user in launching applications.

SUMMARY OF THE INVENTION

In accordance with one aspect of the invention, a computer system is provided, with the computer system including a display screen, data and instruction storage, and a microprocessor. The data and instruction storage stores a number of applications, a startup configuration database, and a launch history database storing data corresponding to previously launched applications within the plurality of applications. The microprocessor is programmed to perform a method comprising:

a) reading data within the startup configuration database;

b) launching an application within the number of applications from data corresponding to the application within the startup configuration database;

c) displaying a first user interface on the display screen providing for user selection of an application within the plurality of applications;

d) launching a user-selected application in response to a selection signal indicating user selection of the application;

e) writing data corresponding to the user-selected application to the launch history database;

f) determining from data stored within the launch history database that the user-selected application has been launched a number of times exceeding a launch number criterion; and g) writing data to the startup configuration database corresponding to the user-selected application.

Preferably, the method additionally includes determining from data stored within the launch history database that the user-selected application has been launched a percentage of times exceeding a launch percentage criterion.

Preferably, a second user interface is additionally displayed on the display screen, providing for a user selection indicating whether the user wants the user-selected application to be launched during subsequent operating sessions. The second user interface may additionally provide for user selections indicating whether the user wants the user-selected application to be removed from consideration for launching during subsequent operating sessions, and for another user selection for indicating whether applications removed from consideration in this way should be reconsidered. If such applications are to be reconsidered, the launch number criterion and the launch percentage criterion are preferably held at higher values for such reconsideration.

If the computer system is operating in a single user mode, an operating session begins with loading, or booting, the operating system and ends with the computer system being shut down or turned off, so that the operating system must be rebooted to begin the next operating session. Alternatively, if the computer system is operating in a multi-user mode, an operating session begins when an individual user logs in on the computer system, and ends when the user logs off or when the system is turned off or shut down.

With the computer system operating in a multi-user mode, the startup configuration database includes a number of user configuration data structures for a number of users of the computer system, and the launch history database includes a number of launch history data structures for a number of users of the computer system. Step a) of the method performed by the microprocessor is preceded by a user logging onto the computer system. Then, data written to and read from the startup configuration database is written to and read from the user configuration database of the user that has logged onto the system. Additionally, data written to and read from the launch history database is written to and read from the launch history data structure of this user.

The method of the invention may be performed in accordance with instructions from an automatic startup configuration utility supplied as part of the operating system or as a computer program product supplied separately from the operating system.

BRIEF DESCRIPTION OF THE DRAWINGS

FIG. 2 is a flow chart of processes occurring within the computer system of FIG. 1 following power on;

FIG. 3 is a display screen within a user interface providing for user inputs to the automatic startup configuration utility in the system of FIG. 1;

FIG. 4 is a pictographic view of a launch history data structure maintained and used by the automatic startup configuration utility in the system of FIG. 1.

DETAILED DESCRIPTION OF THE INVENTION

Figure 1:
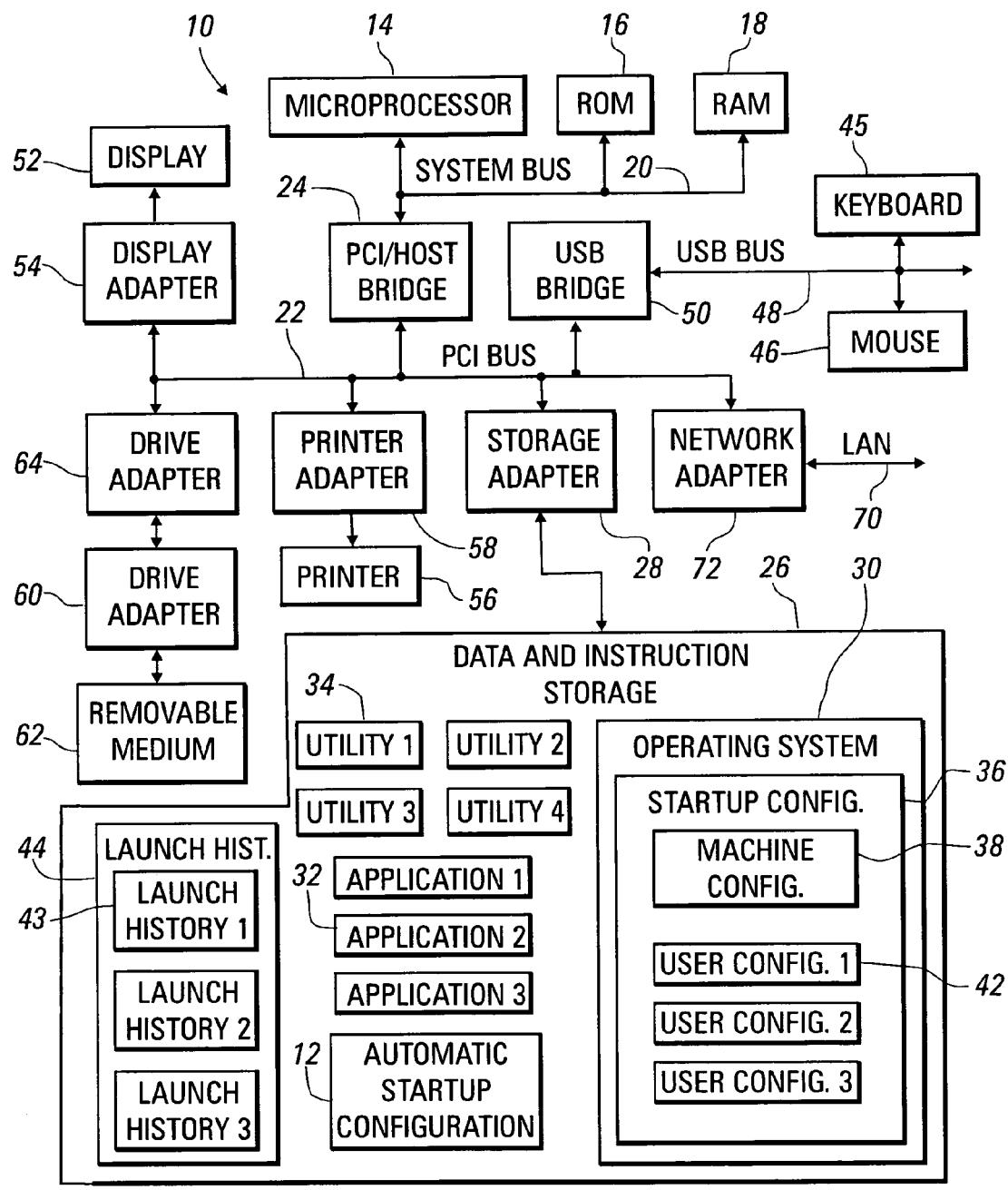
FIG. 1 is a block diagram of a computer system having an automatic startup configuration utility for operation in accordance with the present invention.

FIG. 1 is a block diagram of a computer system 10 having an automatic startup configuration program 12 for operation in accordance with the invention. The computer system 10 includes a microprocessor 14 executing program instructions stored in a read-only memory (ROM) 16 and additionally in a random-access memory (RAM) 18, both of which are connected to the microprocessor 14 through a system bus 20. The microprocessor 14 is also connected to a Peripheral Component Interconnect (PCI) bus 22 through a PCI/host bridge circuit 24.

The computer system 10 also includes data and instruction storage 26, connected to the PCI bus 22 through a storage adapter 28. For example, if the data and instruction storage 26 is a hard disk, the storage adapter 28 is a suitable hard disk adapter. Program instructions from the data and instruction storage are typically loaded into RAM 18 for execution of a program within the microprocessor 12. Data and instruction storage 26 includes an operating system 30, which controls the allocation and usage of hardware resources within the computer system 10, providing a foundation for the operation of applications, a number of applications 32, which can be individually started by the user for performing specific tasks, and a number of utilities 34, which are designed to perform maintenance and to improve the efficiency of processes occurring within the computer system 10.

The operating system 30 includes a startup configuration database 36, which stores startup information, hardware settings, and file locations, used by the operating system 30, and stored by the operating system the automatic startup configuration utility 12, other utilities 34, and applications 32. The startup configuration database 36 includes a machine configuration data structure 38 that contains hardware and machine-specific setup information for the computer system 10, and a user configuration data structure 42 for each user registered to have an account within the computer system 10. Each of the user configuration data structures 42 includes user-specific information, such as color preferences and the locations of e-mail files. For example, the machine configuration data structure 38 and each of the user configuration data structures 42 include as entries a number of variables, which in turn include data describing a path to start a utility 34 or an application 32 during a startup sequence. In accordance with the present invention, each of the user configuration data structures 42 can include such data used to start applications 32 during a startup sequence, based on a history of the selection of the particular applications 32 by the user associated with the particular user configuration data structure 42 during initial portions of past operating sessions.

For example, if the operating system 30 is Microsoft WINDOWS® XP, the startup configuration database 36 is located within the Registry, the machine configuration data structure 38 is the Local Machine Key data structure, and each of the user configuration data structures 42 is one of the User Subkey data structures within the User Key data structure.

For example, if the operating system 30 is a version of UNIX, the machine configuration data structure is the init.d directory, and the machine configuration data structure is rcX.d directory, with the run level being set to 3 at initialization to operate in a multi-user mode.

In accordance with a preferred version of the invention, data and instruction storage 26 additionally includes a launch history database 44 having a launch history data structure 44 for each of the users having an account with the computer system 10. Each user launch history data structure 44, which is used and maintained by the automatic startup configuration utility 12, stores data representing the number of times an application 32 has been started, or launched, by the particular user during an initial period of operation of the computer system 10, together with data representing the number of times the application 32 could have been launched during such an initial period of operation. Since applications are being added to boot during the first part of the operating session, only the applications selected during the initial period are considered.

The computer system 10 additionally includes a number of conventional elements, such as a keyboard 45 and mouse 46, for providing user inputs, attached to a Universal Serial Bus (USB) 48, which is in turn attached to the PCI bus 22 by means of a USB bridge interface circuit 50. For example, the keyboard 45 and mouse 46 are used together or individually to provide user selection inputs to user interfaces presented by the computer system 10. Outputs from the computer system are provided through a display screen 52, which is attached to the PCI bus 22 through a display adapter circuit 54, and through a printer 56, which is connected to the PCI bus 22 through a printer adapter circuit 58. The computer system 10 further includes a drive unit 60, accepting a computer readable medium 62 to read data therefrom, which is connected to the PCI bus 22 through a drive adapter For example, the computer readable medium 62 may be a compact disk or a rewritable compact disk, with the drive unit being a compatible device. The computer system 10 is optionally attached to a computer network, such as a local area network (LAN) through a network adapter 72.

The automatic startup configuration 12 utility may be provided and loaded into the computer system 10 as a part of the operating system 30 or as a separate computer program product. Program instructions and data may be read from the computer readable removable medium, to be stored within data and instruction storage 26, which additionally comprises a computer readable medium on which computer code is embodied. Alternately, program instructions and data may be received as a computer data signal embodied on a carrier wave from the LAN 70 through a wired or wireless connection or from an external device (not shown) additionally connected to the USB bus 48.

Figure 2:
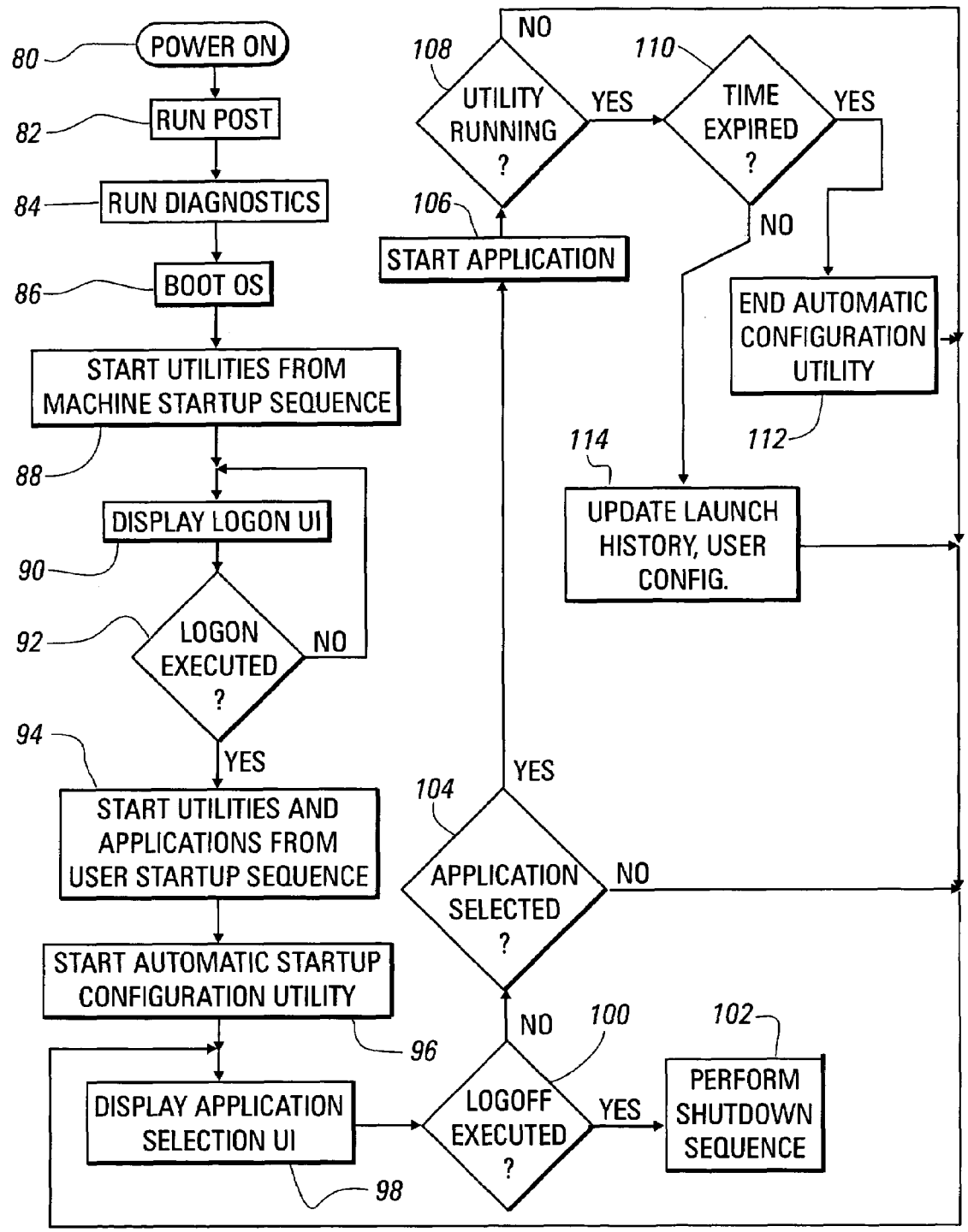

FIG. 2 is a flowchart of processes occurring during operation of the computer system 10 in accordance with the invention. In the example of FIG. 2, the system 10 is shown as operating in a multi-user mode, with the current user being required to log onto the system 10, and with an operating session being started when it is recognized that the user has properly logged on. When the operating session begins, various utilities and applications associated with information stored in the user configuration data structure 42 associated with the user that has just logged on are started or run. The operating session is preferably ended by conventional means, such as the user logging off or by turning off power to the computer system 10. Another operating session may be started with another user logging on or with the same user logging on again after the computer system 10 is turned on.

It is understood that the invention can be applied within a single-user system, which may not have multi-user capability in a similar manner. Such a system would have only one user configuration file 42 and only one launch history file 43. An operating session would begin with the operating system 30 being booted, possibly without requiring the user to log on, and end with the system being shut down.

Referring to FIG. 2, after power is turned on within the system 10 in step 80, a Power On, Self Test (POST) sequence is run in step 82 to check various hardware components under control of BIOS code stored, for example, in ROM 16. Then, while remaining under control of BIOS, further diagnostics are performed in step 84. Then, in step 86, the operating system 30 is booted or loaded from data and instruction storage 26. In step 88, various utilities from the machine startup sequence are run, being located using file path information stored in the machine key data structure 38. Next, in step 80, the logon user interface is displayed on the display screen 52, with the system 10 then waiting for the user to successfully execute a logon. The logon process may consist merely of selecting a user name from a list of names displayed on the screen 52, or it may additionally be necessary to enter a password. In either case, when it is determined in step 92 that a successful logon has been completed, the system 10 proceeds to step 94, in which a number of utilities specific to the particular user that has logged on are run, being located by using file path data stored within the user configuration data structure 42 for that particular user. If this user configuration data structure 42 additionally stores information providing file path data to applications 32 stored within data and instruction storage 26, these applications 32 are additionally started. Some of the utilities run for only a short time after being started, loading device drivers, for example, or storing data representing the color preferences of the user for a particular application 32. Other utilities may remain running as background applications in a multitasking environment.

Then, in step 96, the automatic startup configuration utility 12 is started, along with the display of a user interface allowing the user to start applications 32, which is started in step 98. After starting in step 96, the automatic startup configuration utility 12 preferably runs in the background of a multitasking environment for a predetermined period of time, adding data used to start applications 32 selected by the user to the user configuration data structure 42 associated with the user when certain conditions are met during an initial portion of the operating session.

The application selection user interface preferably provides a number of ways in which the user can choose an application 32 to start. For example, this user interface may include a desktop display including a number of icons representing applications 32 to be started, a start bar including a subset of icons for starting frequently used programs, a list of all applications 32 from which selections are to be made, and a command line on which a path to a file location starting an application 32 is typed. Preferably, the application selection user interface also provides the user with a means for logging off. If the user executes the logoff process, as determined in step 100, the system 10 performs a shutdown sequence in step 102. The shutdown sequence includes closing any applications 32 that are open after asking the user whether he wants to save the data generated during the operation of the application 32, if this data has not been saved. The shutdown process of step 102 may also include shutting the computer system 10 off, or the computer system 10 may be left on, returning to step 90 to wait for another user to log on.

If it is determined in step 100 that the user has not logged off, the system 10 proceeds to step 104 to determine whether an application 32 has been selected by the user through the application selection user interface. If it has not, the system 10 returns to step 98 to continue displaying this user interface. If an application 32 has been selected, the selected application 32 is started in step 106. Then the system 10 proceeds to step 108 to determine if the automatic startup configuration utility 12 is still running. If it is not, the system 10 returns to step 98 to continue displaying the application selection user interface, running in the background with the application just started in step 106 running in the foreground.

If it is determined in step 108 that the automatic startup configuration utility 12 is still running, an additional determination is made in step 110 of whether the time for operation of the utility has expired. If it has, operation of the utility 12 is ended in step 112, with the system 10 then returning to step 98 to continue displaying the application selection user interface, running in the background. If this time has not expired, the system 10 proceeds to step 114, in which the automatic startup configuration utility 12 updates the launch history data structure 44 and the user configuration data structure 42 associated with the particular user of the computer system 10. Processes occurring within step 114 will be discussed in detail in reference to FIG. 5.

FIG. 3 is a display screen view of a dialog box 120 within a user interface providing for user inputs to the automatic startup configuration utility 12. The dialog box 120 is displayed as a part of step 114 during operation of the automatic startup configuration utility 12 after the user selects an application 32, when it is additionally determined that the application meets previously established criteria for automatic launching.

The dialog box 120 includes a first check box 122, which is checked to indicate that the application 32 that has just been launched should be added to the applications that are automatically launched after login and a second check box 124 that is checked to indicate that the application 32 that has just been launched should be removed from consideration for automatic launching. A third check box 126 is checked to indicate that an application that has been removed from consideration by checking the second check box 124 should not later be reconsidered. A first text box 128 is used to provide a numeric value indicating a number of times that an application 32 that has not been removed from consideration must be launched before it can be considered for automatic launching. A second text box 130 is used to provide numeric value indicating a number of times that an application 32 that has been removed from consideration must be launched before it can be considered for automatic launching. A third text box 132 is used to provide a numeric value indicating a launch percentage, derived from the number of times the application 32 was launched during the period of operation of the utility 12 as a percentage of the times that it could have been launched, for the applications that have not been removed from consideration. A fourth text box 134 is used to provide a numeric value indicating a launch percentage, derived from the number of times the application 32 was launched during the period of operation of the utility 12 as a percentage of the times that it could have been launched, for the applications that have been removed from consideration. The dialog box 120 additionally includes a command button 136, which is selected by the user to indicate that he has finished making selections or changing numbers, and is ready for the system 10 to proceed.

The dialog box 120 operates in a conventional manner, being driven by conventional program instructions, so that the check boxes 122, 124, and 126 are alternately checked and cleared when they are selected, and so that typed numbers are placed in the text boxes 128, 130, 132, and 134, which can be cleared by moving the curser through the boxes with a mouse button depressed. Alternately, numbers within the text boxes may be incremented or decremented by selecting a button having an upward or downward pointing arrow. When the third check box 126 is checked, the text boxes 132, 134 associated with applications removed from consideration are cleared. When a numerical value is entered into either of these text boxes 132, the third check box 126 is cleared.

Data derived from the condition of the first two check boxes 122, 124 is applied to an application 32 that has just been launched by the user. Data derived from the condition of the third check box 126, and from the numbers displayed in the text boxes 128, 130, 132, 134 is used to control settings used by the automatic configuration startup utility 12 for application to applications subsequently launched by the user.

FIG. 4 is a pictographic view of one of the launch history data structures 44, which includes a data record 140 for each of the applications 32 that has been launched during operation of the automatic startup configuration utility 12. Each of the data records 140 includes a first data field 142 storing an alphanumeric value identifying the particular application 32. For example, this value may include the data path used to start the application 32. A second data field 144 includes a blacklist flag variable, which is set when an application is removed from consideration using the second check box 124, and which otherwise remains in a reset condition. A third data field 146 includes a numeric value representing the number of times the particular application 32 was launched by the user during operation of the automatic startup configuration utility 12. A fourth data field 148 includes a numeric value representing the number of times the user has logged on since the first time the application 32 was launched by the user.

Figure 5A:
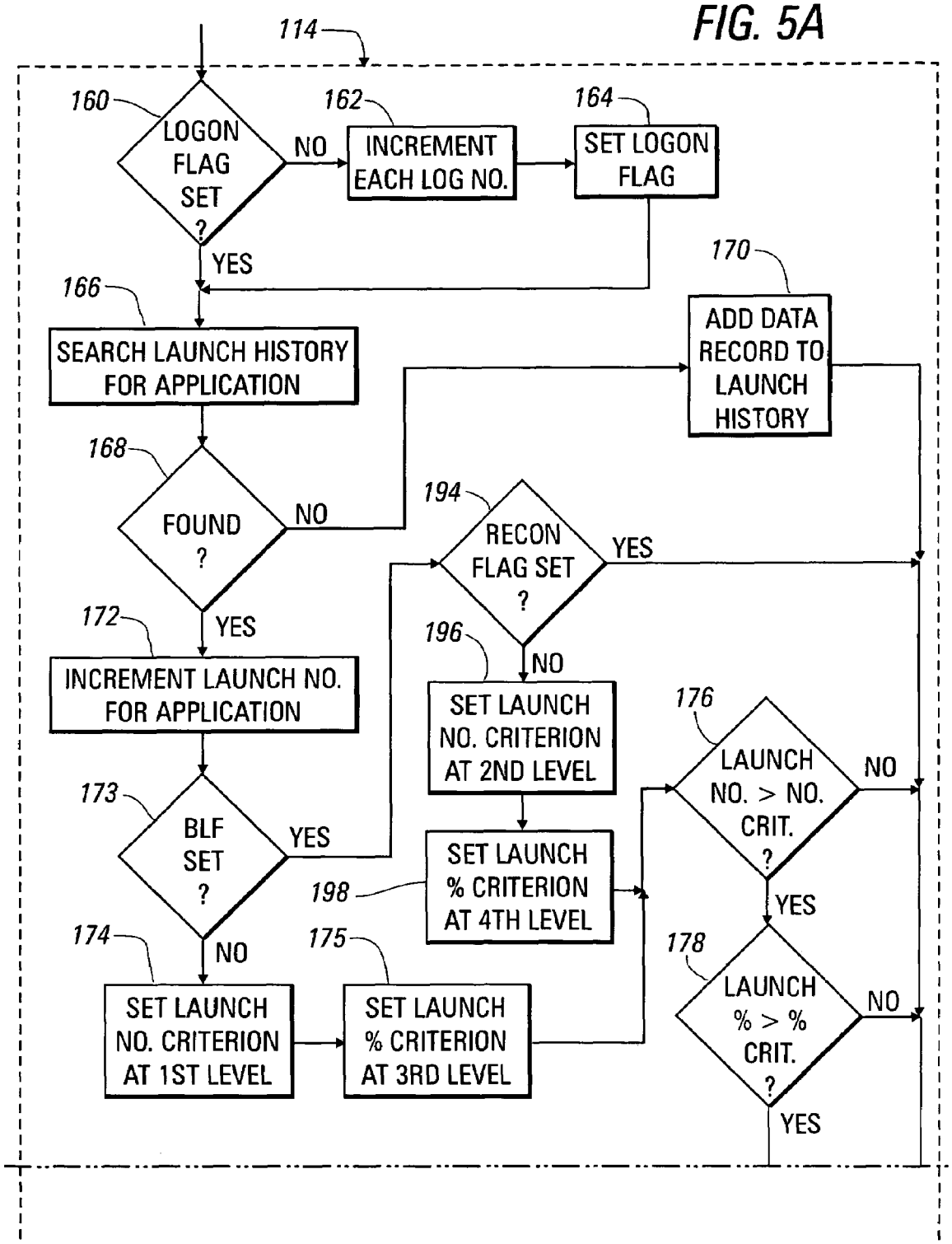
FIG. 5 is a flow chart of a process occurring during a step updating data structures within the processes of FIG. 2, with FIG. 5 being divided into an upper portion, indicated as FIG. 5A, and a lower portion, indicated as FIG. 5B.
Figure 5B:
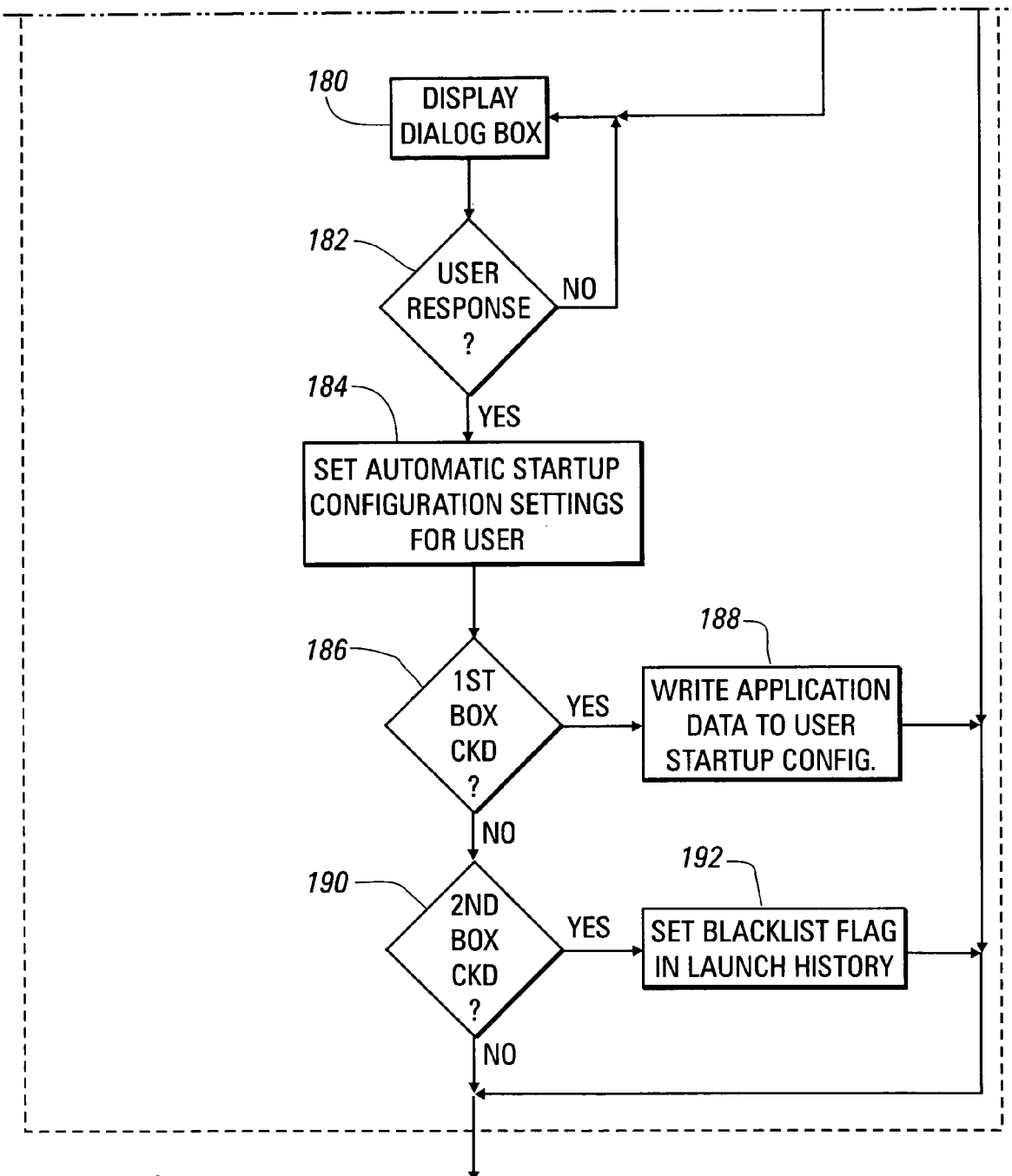

FIG. 5 is a flow chart of a process occurring during step 114 of FIG. 2, in which the launch history 44 and user configuration data structure 42 of the user, who has just launched an application 32, is updated. FIG. 5 is divided into an upper portion, indicated as FIG. 5A, and a lower portion, indicated as FIG. 5B.

Referring again to FIG. 2, this process of step 114 is performed after it is determined in step 104 that the user has launched an application, additionally after it is determined in step 108 that the automatic startup configuration utility 12 is running, and after further determining in step 110 that the time for running this utility 12 has not yet expired. As shown in FIG. 5, the process of step 114 begins with a determination in step 160 of whether the logon flag is set. The logon flag is used by the automatic startup configuration utility 12 to assure that the log numbers, stored in the fourth data field 148 of the user history data structure 42 and associated with each application 32 that has been launched in the past by the user are incremented once and only once when the user logs on and launches an application. Thus, after determining in step 160 that the logon flag is not set, each of the log numbers stored in the fourth data field 148 of the user registry is incremented, by the addition of a value of one, in step 162. Then, in step 164, the logon flag is set, so that the launching of additional applications 32 will during this operation of the automatic startup configuration utility 12 will not cause these log numbers to be again incremented. The logon flag is reset when operation of the automatic startup configuration utility is ended, as in step 112 of FIG. 2.

This process increments the log numbers only after the user launches an application following logon during the operation of the automatic startup configuration utility 12. If the user does not launch an application during this time, these log numbers are not incremented. Alternately, the process of starting the automatic startup configuration utility 12 in step 96 of FIG. 12 may contain the step of incrementing each of the log numbers, counting each time the user logs on, even if he does not launch an application 32. With this alternative, the process of step 114 begins with step 166, with steps 160, 162, and 164 having been eliminated.

In either case, in step 166, the launch history data structure 44 of the particular user is searched for data identifying the application 32 that the user has most recently selected to be launched in step 104. If such data is not found, as determined in step 168, a new data record 140, including data identifying the most recently launched application in the first data field 142 and numbers having the value of one in the third and fourth data fields 146 and 148, is added to the launch history data structure 44 of the user. In this way, only the times the user logs in after the first launch of a new application 32 is counted in determining the launch percentage of the application 32.

Referring to FIGS. 3-5, on the other hand, if it is determined in step 168 that data identifying the application 32 that has been most recently launches has been found in the launch history data structure 44 of the user, the launch number in the third data field 146 of the data record 140 associated with this application is incremented, by the addition of a value of one, in step 172. Then, in step 173, a determination is made of whether the blacklist flag the second data field 144 of the data record 140 associated with this application. If it is determined that the blacklist flag has not been set, i.e. that the application has not been previously removed from consideration using the second checkbox 124, the system 10 proceeds to step 174, in which a launch number criterion is set to a first level, which has been set using the first text box 128. Then, in step 175, a launch percentage criterion is set to a third level, which has been set using the third text box 132. Next, in step 176 it is determined whether the launch number for the application, which has been incremented in step 172, exceeds the launch number criterion, a first criterion. If it does, an additional determination is made in step 178 of whether the launch percentage of the application 32 exceeds the launch percentage criterion. As a part of this determination, the launch percentage of the application 32 is calculated by dividing the launch number, from the third data field 146 of the data record 140 associated with the application 32, by the log number 148, found in the fourth data field 148 of this data record 140, and by multiplying the result by one hundred to obtain a percentage.

If both of these criteria are met, with the launch number of the application exceeding the launch number criterion and the launch percentage of the application exceeding the launch percentage criterion, the system 10 proceeds to step 180, in which the dialog box 120 is displayed to provide for an input from the user. The user then makes any desired changes to the dialog box 129. When it is determined in step 182 that the user has completed his response by selecting the command button 136, the settings of the automatic startup configuration utility 12 for the user are updated in step 184, so that these settings reflect any changes made using the third check box 126 or any of the text boxes 128, 130, 132, or 134. Then, in step 186, a determination is made of whether the first check box 122 has been checked. If it has, data representing the application 32 most recently launched is written to the user configuration data structure 42 of the user (shown in FIG. 1), so that this application 32 will be subsequently launched with the user logs on. The system 10 then returns from the process of step 114 to step 98 (shown in FIG. 2) to continue displaying the application selection user interface, running in the background during operation of the application 32 that has been most recently launched.

If it is determined in step 186 that the first check box 122 has not been checked, a further determination is made in step 190 of whether the second check box 124 has been checked to indicate that this application 32 should be removed from further consideration for automatic launching. If it has been checked, the blacklist flag is set in step 192 within the second data field 144 of the data record 140 corresponding to the application 32. The system 10 then returns from the process of step 114 to step 98 to continue displaying the application selection user interface.

On the other hand, if it is determined in steps 176 and 178 that the launch number for the application 32 does not exceed the launch number criterion, or that the launch percentage of this application 32 does not exceed the launch percentage criterion, the system 10 returns from the process of step 114 to step 98 without displaying the dialog box 120 and without making changes to the settings of the automatic startup configuration utility 12 or to the user configuration data structure 42.

If it is determined in step 173 that the blacklist flag is set within the data record 140 of the most recently launched application 32, a further determination is made in step 194 of whether a reconsideration flag has been set using the third check box 126, so that applications that have teen removed from consideration are never reconsidered for automatic launching. If the reconsideration flag has been set, the system 10 then returns from the process of step 114 to step 98 without displaying the dialog box 120 and without making changes to the settings of the automatic startup configuration utility 12 or to the user configuration data structure 42.

If it is determined in step 194 that the reconsideration flag has not been set, the system 10 proceeds to step 196, in which the launch number criterion is set to the second level, which has been set using the second text box 130. Then, in step 198, the launch percentage criterion is set at the fourth level, which has been set using the fourth text box 134. The system 10 then proceeds to step 176 to begin the process described in detail above of comparing the launch number of the application 32 with the launch number criterion and of comparing the launch percentage of the application 32 with the launch percentage criterion. If both of these criteria are exceeded, the dialog box 120 is displayed in step 180; otherwise, the system 10 proceeds to step 98 (shown in FIG. 2) without updating the user startup configuration 42.

While the invention has been described in its preferred forms or embodiments with some degree of particularity, it is understood that this description has been given only as an example, and that many variations can be made without departing from the spirit and scope of the invention, as defined in the appended claims.

What is claimed is:

1. A method for causing an application selected for launching by a user during an operating session of a computer system to be launched during subsequent operating sessions, wherein the method comprises:
   a) determining that the application has been launched during a portion of the operating session;
   b) determining that the application has been launched a number of times exceeding a launch number criterion during portions of previous operating sessions, wherein the launch number criterion is held at a first level in response to a determination that a blacklist flag has not been set regarding the application during a previous operating session in response to a selection signal indicating that the user wants the application to be removed from consideration to be launched during subsequent operating sessions, and wherein the launch number criterion is held at a second level in response to a determination that a blacklist flag has been set regarding the application during a previous operating session in response to a selection signal indicating that the user wants the application to be removed from consideration to be launched during subsequent operating sessions;
   c) determining that the application has been launched a percentage of times exceeding a launch percentage criterion during the portions of previous operating sessions, wherein the launch percentage criterion is held at a third level in response to a determination that a blacklist flag has not been set regarding the application during a previous operating session in response to a selection signal indicating that the user wants the application to be removed from consideration to be launched during subsequent operating sessions, and wherein the launch percentage criterion is held at a fourth level in response to a the launch percentage criterion is held at a fourth level in response to a determination that a blacklist flag has been set regarding the application during a previous operating session in response to a selection signal indicating that the user wants the application to be removed from consideration to be launched during subsequent operating sessions;
   d) displaying a user interface providing for a user selection indicating that the user wants the application to be launched during the subsequent operating sessions, wherein the user interface additionally provides for a user selection indicating that the user wants the application to be removed from consideration to be launched during subsequent operating sessions;
   e) receiving a selection signal indicating that the user wants the application to be launched during the subsequent operating sessions; and
   f) writing data to a startup sequence causing the application to be launched by the computer system during the subsequent operating sessions.

2. A method for causing an application selected for launching by a user during an operating session of a computer system to be launched during subsequent operating sessions, wherein the method comprises:
   a) determining that the application has been launched during a portion of the operating session;
   b) determining that the application has been launched a number of times exceeding a launch number criterion during portions of previous operating sessions;
   c) determining that the application has been launched a percentage of times exceeding a launch percentage criterion during the portions of previous operating sessions;
   d) displaying a user interface providing for a user selection indicating that the user wants the application to be launched during the subsequent operating sessions, wherein the user interface additionally provides for a first user selection indicating that the user wants the application to be removed from consideration to be launched during subsequent operating sessions and for a second user selection indicating that the user wants applications removed from consideration to be launched during subsequent operating sessions not to be reconsidered for launching during subsequent operating sessions;

e) receiving a selection signal indicating that the user wants the application to be launched during the subsequent operating sessions;

f) writing data to a startup sequence causing the application to be launched by the computer system during the subsequent operating sessions;

g) determining whether a blacklist flag has been set regarding the application during a previous operating session in response to a selection signal indicating that the user wants the application to be removed from consideration to be launched during subsequent operating sessions;

h) in response to a determination that the blacklist flag has not been set, holding the launch number criterion at a first level and holding the launch percentage criterion at a third level;

i) in response to a determination that the blacklist flag has been set, holding the launch number criterion at a second level and holding the launch percentage criterion at a fourth level; and j) in response to a determination that the blacklist flag has been set, determining that a reconsideration flag has not been set in response to a selection signal indicating that the user wants applications removed from consideration to be launched during subsequent operating sessions not to be reconsidered for launching during subsequent operating sessions.

3. The method of claim 2, wherein the user interface additionally provides for user selections setting the first, second, third, and fourth levels.

4. A computer system comprising a display screen; data and instruction storage storing a plurality of applications, a startup configuration database, and a launch history database storing data corresponding to previously launched applications within the plurality of applications; and a microprocessor programmed to perform a method comprising:

a) reading data within the startup configuration database;

b) launching an application within the plurality of applications from data corresponding to the application within the startup configuration database;

c) displaying a first user interface on the display screen providing for user selection of an application within the plurality of applications;

d) launching a user-selected application in response to a selection signal indicating user selection of the application;

e) writing data corresponding to the user-selected application to the launch history database;

f) determining from data stored within the launch history database that the user-selected application has been launched a number of times exceeding a launch number criterion;

g) determining from data stored within the launch history database that the user-selected application has been launched a percentage of times exceeding a launch percentage criterion;

h) displaying a second user interface on the display screen providing for a user selection indicating that the user wants the user-selected application to be launched during subsequent operating sessions, wherein the second user interface additionally provides for a first user selection indicating that the user wants the user-selected application to be removed from consideration to be launched during subsequent operating sessions and for a second user selection indicating that the user wants applications removed from consideration to be launched during subsequent operating sessions not to be reconsidered for launching during subsequent operating sessions;

i) receiving a selection signal indicating that the user wants the user-selected application to be launched during the subsequent operating sessions; and j) writing data to the startup configuration database corresponding to the user-selected application;

k) determining whether a blacklist flag has been set regarding the user-selected application during a previous operating session in response to a selection signal indicating that the user wants the user-selected application to be removed from consideration to be launched during subsequent operating sessions;

l) in response to a determination that the blacklist flag has not been set, holding the launch number criterion at a first level and holding the launch percentage criterion at a third level;

m) in response to a determination that the blacklist flag has been set, holding the launch number criterion at a second level and holding the launch percentage criterion at a fourth level; and n) in response to a determination that the blacklist flag has been set, determining that a reconsideration flag has not been set in response to a selection signal indicating that the user wants applications removed from consideration to be launched during subsequent operating sessions not to be reconsidered for launching during subsequent operating sessions.

5. The computer system of claim 4, wherein the second user interface additionally provides for user selections setting the first, second, third, and fourth levels.

6. A computer system comprising a display screen; data and instruction storage storing a plurality of applications, a startup configuration database including a number of user configuration data structures for a number of users of the computer system, and a launch history database including a number of user launch history data structures for a number of users of the computer system storing data corresponding to previously launched applications within the plurality of applications; and a microprocessor programmed to perform a method comprising:

a) determining that a user has logged onto the computer system, b) reading data within the startup configuration database; wherein, c) launching an application within the plurality of applications from data corresponding to the application within the startup configuration database;

d) displaying a first user interface on the display screen providing for user selection of an application within the plurality of applications;

e) launching a user-selected application in response to a selection signal indicating user selection of the application;

f) writing data corresponding to the user-selected application to the launch history database, wherein, as the method is performed, data written to and read from the launch history database is written to and read from the user launch history data structure of the user logging onto the computer system;

g) determining from data stored within the launch history database that the user-selected application has been launched a number of times exceeding a launch number criterion; and h) writing data to the startup configuration database corresponding to the user-selected application, wherein as the method is performed, data written to and read from the startup configuration database is written to and read from the user configuration data structure of the user logging onto the computer system.

7. A computer system comprising a display screen; data and instruction storage storing a plurality of applications, a startup configuration database, and a launch history database storing data corresponding to previously launched applications within the plurality of applications; and a microprocessor programmed to perform a method comprising:
   a) reading data within the startup configuration database;
   b) launching an application within the plurality of applications from data corresponding to the application within the startup configuration database;
   c) displaying a first user interface on the display screen providing for user selection of an application within the plurality of applications;
   d) launching a user-selected application in response to a selection signal indicating user selection of the application;
   e) writing data corresponding to the user-selected application to the launch history database, wherein data is written to the launch history database corresponding to the user-selected application only during a predetermined period following launching applications within the plurality of applications from data corresponding to the applications within the startup configuration database;
   f) determining from data stored within the launch history database that the user-selected application has been launched a number of times exceeding a launch number criterion; and
   g) writing data to the startup configuration database corresponding to the user-selected application, wherein data is written to the startup configuration database corresponding to the user-selected application only during a predetermined period following launching applications within the plurality of applications from data corresponding to the applications within the startup configuration database.

8. A computer program product stored in a computer system having a microprocessor executing program steps from an operating system launch applications from data corresponding to the applications stored within a startup configuration database, wherein the computer program product includes a computer usable medium having computer readable program code embodied thereon causing the microprocessor to additionally perform a method comprising:
   a) determining through an operating system interface with the operating system that a selected application has been launched;
   b) writing data corresponding to the selected application to a launch history data file,
   c) determining from data stored within the launch history database that the selected application has been launched a number of times exceeding a launch number criterion, wherein the launch number criterion is held at a first level in response to a determination that a blacklist flag has not been set regarding the selected application during a previous operating session in response to a selection signal indicating that the user wants the selected application to be removed from consideration to be launched during subsequent operating sessions, and wherein the launch number criterion is held at a second level in response to a determination that a blacklist flag has been set regarding the selected application during a previous operating session in response to a selection signal indicating that the user wants the selected application to be removed from consideration to be launched during subsequent operating sessions;
   d) determining from data stored within the launch history database that the selected application has been launched a percentage of times exceeding a launch percentage criterion, wherein the launch percentage criterion is held at a third level in response to a determination that a blacklist flag has not been set regarding the selected application during a previous operating session in response to a selection signal indicating that the user wants the selected application to be removed from consideration to be launched during subsequent operating sessions, and wherein the launch percentage criterion is held at a fourth level in response to a determination that a blacklist flag has been set regarding the selected application during a previous operating session in response to a selection signal indicating that the user wants the selected application to be removed from consideration to be launched during subsequent operating sessions;
   e) displaying a second user interface on the display screen providing for a user selection indicating that the user wants the selected application to be launched during subsequent operating sessions and additionally providing for a user selection indicating that the user wants the selected application to be removed from consideration to be launched during subsequent operating sessions,
   f) receiving a selection signal indicating that the user wants the selected application to be launched during the subsequent operating sessions; and
   g) writing data corresponding to the selected application to the startup configuration database.

9. A computer program product stored in a computer system having a microprocessor executing program steps from an operating system launch applications from data corresponding to the applications stored within a startup configuration database, wherein the computer program product includes a computer usable medium having computer readable program code embodied thereon causing the microprocessor to additionally perform a method comprising:
   a) determining through an operating system interface with the operating system that a selected application has been launched;
   b) writing data corresponding to the selected application to a launch history data file;
   c) determining from data stored within the launch history database that the selected application has been launched a number of times exceeding a launch number criterion;
   d) determining from data stored within the launch history database that the selected application has been launched a percentage of times exceeding a launch percentage criterion;
   e) displaying a second user interface on the display screen providing for a user selection indicating that the user wants the selected application to be launched during subsequent operating sessions, wherein the second user interface additionally provides for a first user selection indicating that the user wants the selected application to be removed from consideration to be launched during subsequent operating sessions and for a second user selection indicating that the user wants applications removed from consideration to be launched during subsequent operating sessions not to be reconsidered for launching during subsequent operating sessions;

f) receiving a selection signal indicating that the user wants the selected application to be launched during the subsequent operating sessions;

g) writing data corresponding to the selected application to the startup configuration database.

h) determining whether a blacklist flag has been set regarding the selected application during a previous operating session in response to a selection signal indicating that the user wants the selected application to be removed from consideration to be launched during subsequent operating sessions;

i) in response to a determination that the blacklist flag has not been set, holding the launch number criterion at a first level and holding the launch percentage criterion at a third level;

j) in response to a determination that the blacklist flag has been set, holding the launch number criterion at a second level and holding the launch percentage criterion at a fourth level; and k) in response to a determination that the blacklist flag has been set, determining that a reconsideration flag has not been set in response to a selection signal indicating that the user wants applications removed from consideration to be launched during subsequent operating sessions not to be reconsidered for launching during subsequent operating sessions.

10. The computer program product of claim 9, wherein the second user interface additionally provides for user selections setting the first, second, third, and fourth levels.

11. A computer program product stored in a computer system having a microprocessor executing program steps from an operating system launch applications from data corresponding to the applications stored within a startup configuration database, wherein the computer program product includes a computer usable medium having computer readable program code embodied thereon causing the microprocessor to additionally perform a method comprising:

a) determining that a user has logged onto the computer system;

b) determining through an operating system interface with the operating system that a selected application has been launched;

c) writing data corresponding to the selected application to a launch history database, wherein the launch history database includes a number of user launch history data structures for a number of users of the computer system, and wherein, as the method is performed, data written to and read from the launch history database is written to and read from the user launch history data structure of the user logging onto the computer system;

d) determining from data stored within the launch history database that the selected application has been launched a number of times exceeding a launch number criterion; and e) writing data corresponding to the selected application to the startup configuration database, wherein as the method is performed, data written to and read from the startup configuration database is written to and read from a user configuration data structure of the user logging onto the computer system within the startup configuration database.

12. A computer program product stored in a computer system having a microprocessor executing program steps from an operating system launch applications from data corresponding to the applications stored within a startup configuration database, wherein the computer program product includes a computer usable medium having computer readable program code embodied thereon causing the microprocessor to additionally perform a method comprising:

a) determining through an operating system interface with the operating system that a selected application has been launched;

b) writing data corresponding to the selected application to a launch history data file;

c) determining from data stored within the launch history database that the selected application has been launched a number of times exceeding a launch number criterion wherein data is written to the launch history database corresponding to the selected application only during a predetermined period following launching applications within the plurality of applications from data corresponding to the applications within the startup configuration database; and d) writing data corresponding to the selected application to the startup configuration database wherein data is written to the startup configuration database corresponding to the selected application only during a predetermined period following launching applications within the plurality of applications from data corresponding to the applications within the startup configuration database.

* * * * *